ately adjacent to but
United States Patent

Penczak

[11] 4,041,238
[45] Aug. 9, 1977

[54] PRESET HOUSING FOR ELECTRICAL DISTRIBUTION SYSTEMS

[75] Inventor: John P. Penczak, Euclid, Ohio

[73] Assignee: Bargar Metal Fabricating Company, Cleveland, Ohio

[21] Appl. No.: 638,176

[22] Filed: Dec. 5, 1975

[51] Int. Cl.² ............................................. H02G 3/12
[52] U.S. Cl. ............................................ 174/48; 52/221
[58] Field of Search ................... 174/48, 49, 37-39, 174/96, 98; 220/3.2, 3.3, 3.4, 3.5, 3.6; 52/221

[56] References Cited

U.S. PATENT DOCUMENTS

| 340,433 | 4/1886 | Dorsett | 52/221 X |
| 3,701,837 | 8/1972 | Fork | 174/50 |
| 3,943,272 | 3/1976 | Carroll et al. | 174/48 |

FOREIGN PATENT DOCUMENTS

| 873,579 | 6/1971 | Canada | 174/37 |

Primary Examiner—J. V. Truhe
Assistant Examiner—D. A. Tone
Attorney, Agent, or Firm—McNenny, Pearne, Gordon, Gail, Dickinson & Schiller

[57] ABSTRACT

A preset access housing assembly is disclosed for use in underfloor electrical distribution systems having a plurality of raceway cells extending below the floor surface. The housing includes a base wall bridging between two raceway cells and communicating with both cells. A conical member is connected to the base wall around its periphery and converges upwardly with reducing diameter to an open end substantially adjacent to but below the floor surface. Closure means are mounted on the conical member and can be opened to provide user access to the housing. The finished cover means include a finish ring which projects outwardly along the floor surface around the open end of the housing and a flange which extends down through the opening. A cover plate is removably mounted in the finish ring. A bracket is mounted in the housing to support a duplex receptacle and is shaped to isolate a zone within the housing from the remainder of the housing. Such zone is in communication with the cell along which power is supplied to the receptacle. The conical shape provides a continuous curve along the wall of the housing so that adequate strength is provided with relatively thin material. Such conical shape also provides a gradual transition between the diameter at the lower end of the housing and the diameter at the open end to eliminate the existence of weakness resulting from a thin layer of concrete around the housing. During installation a temporary cover closes the opening and is covered with concrete or the like. Such temporary cover is formed with a shallow cup shape so that the concrete over the central portion of the housing is thicker than the concrete around the opening in the conical member.

19 Claims, 6 Drawing Figures

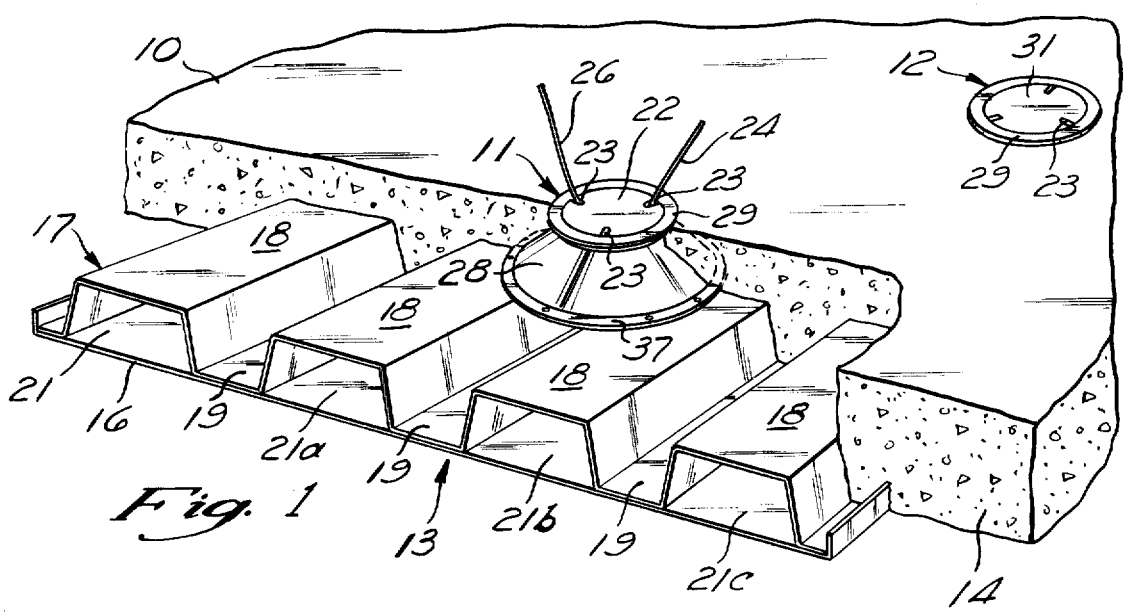
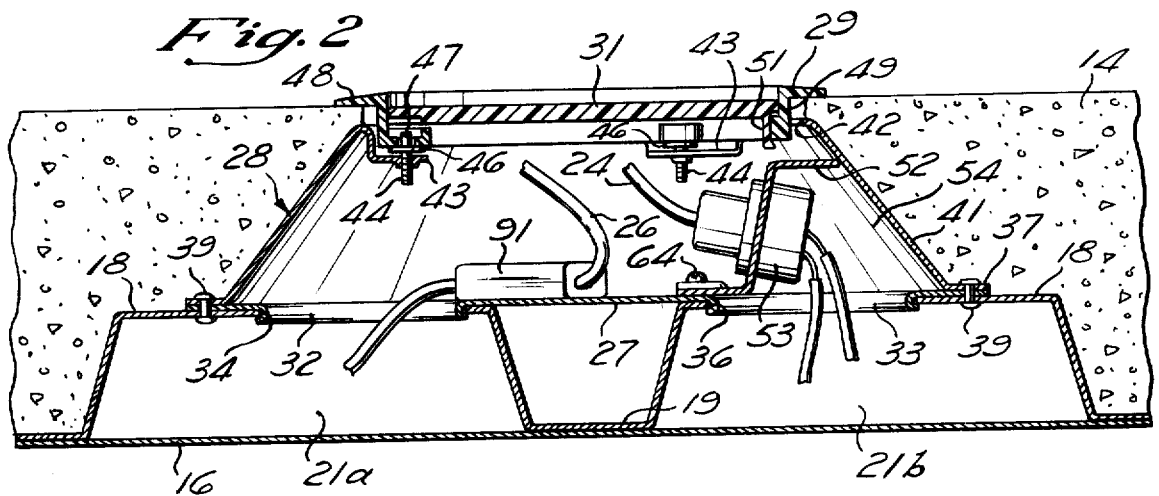
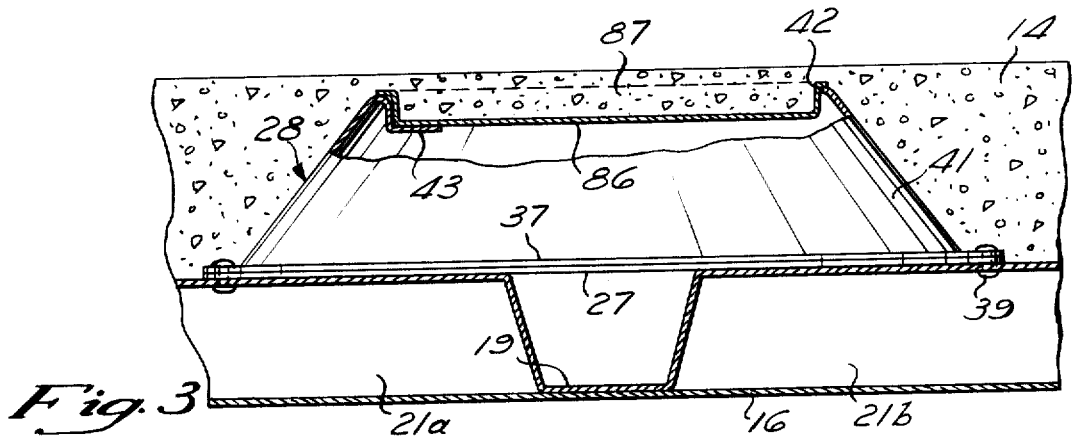

PRESET HOUSING FOR ELECTRICAL DISTRIBUTION SYSTEMS

BACKGROUND OF THE INVENTION

This invention relates generally to underfloor electrical distribution systems, and more particularly to a novel and improved underfloor preset box of access housing, which permits electrical connections to be made beneath the level of the finished floor.

PRIOR ART

The U.S. Pat. No. 3,701,837 to Fork granted Oct. 31, 1972, and No. Re. 28,035 granted June 4, 1974, both disclose an underfloor access housing which bridges between cells of an underfloor cellular electrical distribution system. Such access housings provide an opening which is flush with a finished floor and provide for an electrical plug receptacle along with space for other service connections, such as telephone connections or the like. The housing illustrated in both patents is rectangular in shape and is provided with a circular floor opening located in the upper wall of the rectangular housing.

Such housing extends horizontally from the floor opening and is usually covered by a relatively thin layer of concrete. Such structure is relatively weak, and cracking and breaking of the concrete can occur in the floor surface around the floor opening if heavy loads are imposed thereon. Consequently, it is necessary with such structure to utilize relatively heavy gauge material, at least along the upper surface of the housing, to provide the necessary strength. Further, for a given size unit, access to the interior of the housing is difficult because of the rectangular shape.

The following additional U.S. patents disclose other related structures: Saul et al, U.S. Pat. No. 3,303,264 granted Feb. 7, 1967; Butler, U.S. Pat. No. 3,324,612 granted June 15, 1967; Fork, U.S. Pat. NO. 3,417,191 granted Dec. 17, 1968; Fork, U.S. Pat. No. 3,426,802 granted Feb. 11, 1969; Lohman, U.S. Pat. No. 3,466,379 granted Sept. 9, 1969; Guritz, U.S. Pat. No. 3,609,210 granted Sept. 28, 1971; Klinkman et al, U.S. Pat. No. 3,751,576 granted Aug. 7, 1973; Klinkman et al, U.S. Pat. No. 3,803,341 granted Apr. 9, 1974, and Flachbarth et al, U.S. Pat. No. Re. 27,549 granted Jan. 16, 1973.

SUMMARY OF THE INVENTION

In accordance with the present invention, a novel and improved preset access housing is provided which includes a conical wall that extends from the bottom or lower surface against the underfloor cells to the floor opening. Such conical wall, because of its continuous curved structure, provides high strength without necessitating the use of material of substantial thickness. Further, such structure eliminates the thin layer of concrete, with the result that the floor around the opening does not tend to crack or break under substantial loads.

In the illustrated embodiment, the housing bridges between two underfloor raceway cells, and is open to both, so that the two types of service are available within the housing. A power service is connected to a duplex recepticle mounted in a bracket shaped to completely isolate the power supply cell and the connections to the receptacle. A second service, such as telephone service, is provided within the housing from the other raceway cell.

The conical shape promotes easy access to the entire zone within the housing to facilitate initial connections, as well as user access. During installation a temporary cover is installed, which is covered with a layer of concrete. After the floor is completed, the layer is broken away and the temporary cover is removed. A finish adjusting ring is then installed and the wiring is connected. The structure of the preset box, or housing, provides lower material and manufacturing costs, as well as lower installation costs. Further, improved strength and ease of access is achieved.

BRIEF DESCRIPTION OF THE DRAWINGS

FIG. 1 is a perspective view, partially broken away for purposes of illustration, showing a floor system including preset access housings in accordance with the present invention;

FIG. 2 is a side elevation in vertical section illustrating the structural detail of a preferred access housing in accordance with this invention;

FIG. 3 is a view similar to FIG. 2 at reduced scale, illustrating the condition after the floor is installed, but prior to removal of the temporary cover;

DETAILED DESCRIPTION OF THE DRAWINGS

Figure 4:
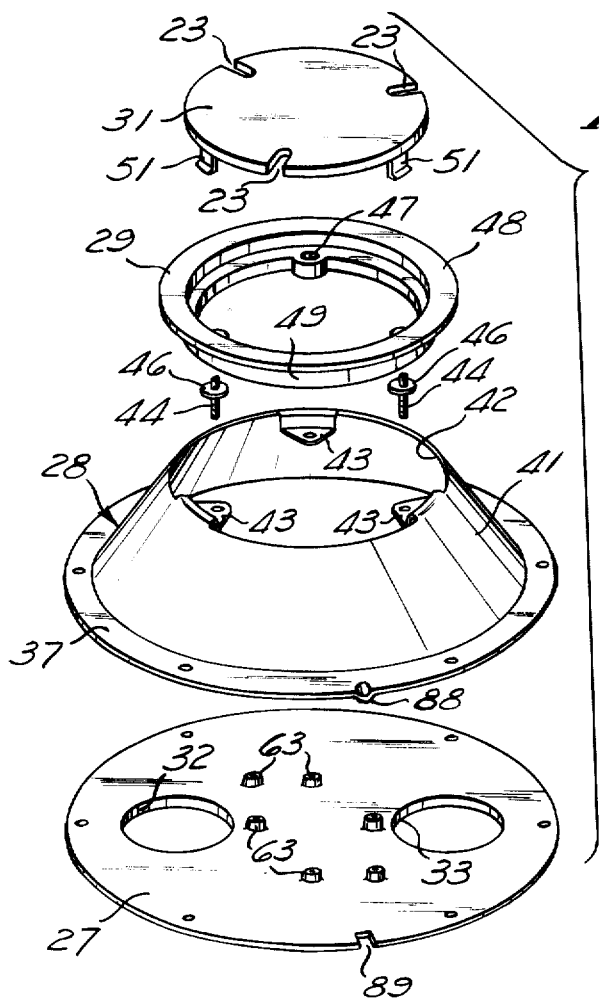
FIG. 4 is an exploded perspective view of the various parts of the access box.

FIG. 1 illustrates a floor 10 having two preset access housing assemblies 11 and 12, in accordance with the present invention installed therein. The floor includes a cellular floor unit 13, which is embedded in and covered by concrete 14 of the floor. The cellular floor unit includes a bottom plate 16 and a top plate 17, formed with alternate crests 18 and troughs 19. The bottom and top plates 16 and 17 cooperate to define a plurality of raceway cells 21, which extend along the floor parallel to each other to receive wire and cable of an electrical distribution system.

The preset access housing assembly 11 bridges between the cells 21a and 21b and extends from the crest 18 to the surface of the floor 10. A removable access cover 22 provides user access to the housing and is provided with three peripherally spaced openings 23, through which cords can extend into the housing. The illustrated housing is preferably arranged to provide a typical duplex receptacle supplied with electrical power so that a cord 24 from a lamp or typewriter, for example, can be plugged into the duplex receptacle supplied with 110 volt power. Similarly, a cord 26 can be connected to the telephone lines. In such instance, the telephone service line are supplied along the cell 21a and the 110 volt power supply lines extend along the cell 21b. In FIG. 1, the preset access housing assembly 12 is illustrated installed to bridge between the cells 21b and 21c. It should be understood that any given preset access housing assembly can be installed to bridge between any particular pair of adjacent cells desired, and that different types of service can be supplied along different cells 21.

Referring to FIGS. 2 and 4, the illustrated access housing assembly includes a circular base plate 27 formed of sheet metal, a conical housing member 28, also formed of sheet metal, an adjustable finish ring 29, preferably molded from plastic, and a cover plate 31. The base plate 27 is provided with a pair of diametrically opposite openings 32 and 33, which match with corresponding openings 34 and 36 formed in the upper surface or crest 18 of the associated cells 21a and 21b. Preferably, the edges of the openings are rolled over to provide a smooth surface at the openings. The conical housing member 28 is provided with a flange 37 at its lower end, which fits against the periphery of the base plate 27. Rivets or other suitable fasteners 39 extend through the flange 37, the periphery of the base plate and the crest 18, to mount the cell assembly in proper position against the cells.

From the flange 37, the side wall 41 of the conical housing member coverges upwardly with reducing diameter, to an opening 42 having a diameter substantially smaller than the diameter of the flange 37. Three symmetrically located mounted tabs 43 extend downward and then radially inward around the opening 42 and are formed with threaded openings to receive adjusting jack screws 44. Such jack screws thread into the openings in the tabs 43 and are provided with shoulders 46 which engage the lower side of the finish ring 29, adjacent to openings 47 formed therein. The upper ends of the jack screws 44 are slotted so that they may be adjusted up or down with a screwdriver to raise and lower the finish ring 29.

The finish ring 29 is formed with a flange 48, which extends out over the surface of the concrete around the opening 42 to provide a finished edge and a depending tubular section 49, which extends down into the opening 42 with clearance. Adjustment of the jack screws 44 insures the proper support of the finish ring flush with the floor surface. The cover plate 31 fits into the finish ring and closes the opening. However, the cover plate is removable by the user to provide easy access into the housing to plug in or remove cords as required. Preferably, the cover plate 31 is provided with legs 51, which snap under the finish ring to removably lock the cover plate in its installed position. Slots 23 are provided around the periphery of the cover plate through which cords extend into the housing, as illustrated in FIG. 1.

Figure 5:
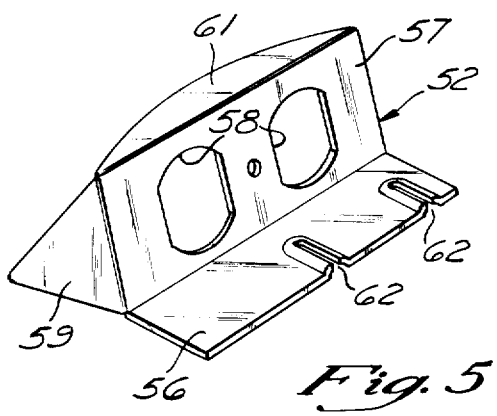
FIG. 5 is a perspective view of one type of bracket on which a duplex receptacle is mounted; and, FIG. 6 is a perspective view of a second type of bracket arranged to permit the mounting of two duplex receptacles.

A mounting bracket 52, illustrated in FIGS. 2 and 5, is secured to the baseplate 27 and is proportioned to support a duplex receptacle 53 and to completely isolate a power zone 54 within the housing from the remaining portions of the access housing. The bracket also closes and isolates the opening 33, communicating with the power supply cell 21b from the remaining portions of the access housing.

The bracket includes a base section 56 which fits along the base plate 27 and upwardly inclined face portion 57 formed with openings 58 to receive the receptacle. Rearwardly extending sides 59 extend back along the base plate and conical section and close the side portions. An arcuate rearwardly extending top portion 61 also extends back to the conical wall to complete the isolation of the zone 53. The base portion 56 is formed with a pair of raised slots 62, which fit over a corresponding pair of bosses 63, formed in the base plate to removably secure the bracket in its installed position. Since the bosses 63 are raised, preferably by the punching thereof, a short, self-tapping screw 64 can be threaded into the base plate, to mount the bracket without extending materially below the base plate. The slots 62 extend parallel to the centerline of the bracket so that the bracket can be slid back against the conical wall after the screws 64 are started and then locked in place by tightening the screws. This structure permits the easy mounting and removal of the bracket 52 without requiring an opening in the crest 17 to receive the screws 64.

Figure 6:
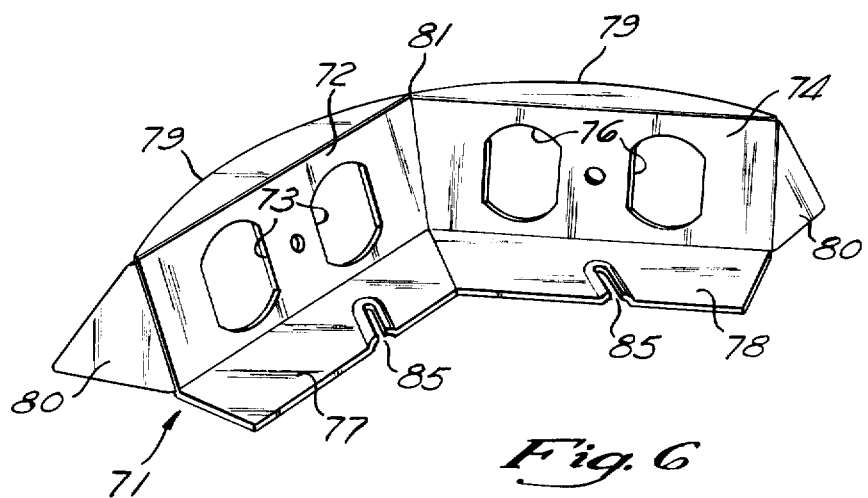

A second embodiment of a bracket is illustrated in FIG. 6. In this embodiment, the bracket 71 is formed to receive two duplex receptacles. This bracket includes a first planar face portion 72, having openings therein 73, to receive a first duplex receptacle. A second planar face 74 extends at an angle, with respect to the first face 71, and is also formed with openings 76 to receive a second duplex receptacle. Here again, the bracket 71 is formed with base portions 77 and 78, which extend along the base plate and are slotted to receive mounting screws. A rearwardly extending end portion 80 is provided at each end of the bracket to fit back along the base plate and the conical wall. Similarly, rearwardly extending upper portions 79 extend back in to the conical wall to enclose the upper portion. The two face portions 72 and 74 about the conical wall at their corners 81 so that the width of the upper portion 79 is of zero lateral width at the center corner 81. With this structure, the bracket 71 can be made to fit closely with the walls of the housing and the bracket 71 can be formed as a simple stamping from sheet metal, which is first stamped out and then bent to the appropriate shape. Here again, slots 85 are formed parallel to the bracket centerline to facilitate easy mounting.

During the installation of the floor, the housing is preferably closed by a temporary cover plate 86, which fits into the opening and closes the opening 42 while the concrete is poured. Various elements are preferably proportioned so that the opening 42 and the cover plate 86 are below the surface of the concrete so that the concrete can be troweled out evenly without difficulty. After the concrete sets, the thin layer of concrete 87 over the temporary cover 86 is broken away and the cover 86 is removed, allowing the installation of the finish ring 29. Preferably, the temporary cover 86 is formed with a shallow cup shape so that the thickness of the concrete 87 immediately thereabove, is greater than the thickness of the concrete at the edge of the opening 42. With such a structure, the concrete in the central portion is sufficiently thick so that it can withstand normal loads without cracking, even though the temporary cover is not formed of particularly heavy gauge material. Generally, the floor is formed with preset access housings located strategically at all locations where it is expected that an electrical supply may be required. However, in some instances, a particular access housing will not be opened and connected for use, but is located in the floor for use in the event that it is required at some later time.

Preferably, the various elements of the housing can be shipped separately and assembled at the time the floor is formed. The packaging of the units is therefore, efficiently accomplished, since the conical housing members 28 can be nested in packages or cartons to reduce the volume for shipping and storage. In order to insure that the proper orientation is provided when the housing is assembled a projection 88 is formed in the flange 37 and is proportioned to fit into a notch 89 formed in the base plate when proper orientation is present. Similarly, mating holes are provided in the flange and base plate to receive the rivets to connect the two housing members together and to secure the housing to the cells.

In FIG. 2, a telephone supply cable extends through the opening 32 to a connector 91, which in turn, connects to the telephone cord 26. It should be understood that although the illustrated embodiment is disclosed as supplying both 110 volt power and telephone service, other electrical services can be provided along the cells and up through the access housings as required. For example, computer network connections can be connected through the preferred embodiment of the present invention.

The conical wall of the housing, because it is formed with a continuous curve, can be formed or relatively thin material without sacrificing strength. Also, such shape eliminates the thin layer of concrete around the opening, which is present in rectangular housings. Therefore, the tendency for the concrete to crack is virtually eliminated even when thin material is used to form the housing.

Although preferred embodiments of this invention are illustrated, it should be understood that various modifications and rearrangements of parts may be resorted to without departing from the scope of the invention disclosed and claimed herein.

What is claimed is:

1. A preset access housing for under floor electrical distribution systems having raceway cells extending below the surface of a concrete or the like floor comprising a base wall adapted to fit against a cell and provide access thereto, a generally conical sidewall joined with said base wall at one end having a first diameter and continuously converging to an open second end having a second diameter substantially smaller than said first diameter, said sidewall being proportioned to locate said open end adjacent to but below the surface of a floor, and closure means closing said open end, said conical sidewall providing a substantially continuous curve for stiffness to support the concrete or the like forming a floor and providing a gradual transition from said first diameter to said second diameter without resulting in a thin layer of concrete or the like in the floor around said open end.

2. A preset access housing as set forth in claim 1 wherein said base wall is proportioned to bridge between at least two separate raceway cells and is formed with separate openings each of which is adapted to connect with the interior of each associated raceway cell.

3. A preset access housing as set forth in claim 2 wherein a receptacle bracket is removably mounted in said housing to support an outlet receptacle and to isolate a zone within said housing, said zone being in communication with one of said openings in said base wall and isolated from the remainder of the interior of said housing.

4. A preset access housing as set in forth in claim 3 wherein said closure means includes a first cover installed in said housing and which is to be covered by said concrete.

5. A preset housing as set forth in claim 3 wherein said bracket is formed with an inclined forward face adapted to receive a receptacle, and rearwardly projecting portions for extension into substantial engagement with said generally conical wall and said basewall.

6. A preset housing as set forth in claim 5 wherein said bracket is formed with two inclined forward faces each adapted to receive a separate receptacle.

7. A preset housing as set forth in claim 5 wherein said bracket includes a flange fitting against said base wall and said base wall are formed with raised portions adapted to receive a mounting screw which does not project substantially below said base wall.

8. A preset housing as set forth in claim 7 wherein said flange is formed with slots which extend parallel to the centerline of said bracket and are proportional to receive mounting screws.

9. A preset access housing as set forth in claim 3, wherein said closure means includes a second cover which is removable to provide access to the interior of said housing.

10. A preset housing as set forth in claim 9 wherein said second cover includes a finish ring which projects around said housing and extends through said open end.

11. A preset housing as set forth in claim 1 wherein said closure means includes a first cover installed in said housing and which is to be covered by said concrete or the like.

12. A preset housing as set forth in claim 1 wherein said base wall and side wall are provided with means to insure assembly thereof is in a predetermined orientation.

13. A preset access housing as set forth in claim 1, wherein said cover means includes a second cover which is removable to provide access to the interior of said housing.

14. A floor structure having an underfloor electrical distribution system comprising concrete or the like providing an upper surface, a plurality of raceway cells embedded in said concrete at a location spaced below said upper surface, and a preset access housing assembly embedded in said concrete, said housing assembly including a base wall bridging between at least two cells and providing an opening open to each cell, a generally conical side wall having a first diameter at its lower end joined to said base wall at the periphery of said lower end, said side wall continuously converging upwardly to an open end substantially adjacent to said surface and having a second diameter smaller than said first diameter, and cover means closing said open end.

15. A floor structure as set forth in claim 14 wherein said cover means is spaced below said surface and is covered with said concrete.

16. A floor structure as set forth in claim 15 wherein said cover means includes a central wall spaced from said surface a greater distance than said open end.

17. A floor structure as set forth in claim 14 wherein said cover means includes a finish ring which projects over said surface around said open end and extends through said open end, said cover means being at least partially removable to provide access to said housing.

18. A floor structure as set forth in claim 14 wherein a receptacle bracket is removably mounted in said housing to support an outlet receptacle and to isolate a zone within said housing, said zone being in communication with one of said openings in said base wall and isolated from the remainder of the interior of said housing.

19. A floor structure as set forth in claim 18 wherein said bracket includes an inclined forward face with a receptacle mounted therein, and rearwardly projecting portions extending into substantial engagement with generally conical wall and said base wall.

* * * * *